United States Patent
Griessbach

(10) Patent No.: US 6,246,130 B1
(45) Date of Patent: Jun. 12, 2001

(54) PROCESS FOR DEACTIVATING PYROTECHNIC ACTUATORS IN A VEHICLE

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/425,022

(22) Filed: Oct. 25, 1999

(30) Foreign Application Priority Data

Oct. 24, 1998 (DE) .............................................. 198 49 079

(51) Int. Cl.[7] .................................................. B60R 21/32
(52) U.S. Cl. ............................................ 307/10.1; 307/121
(58) Field of Search .................... 307/10.1, 121; 280/735; 701/45

(56) References Cited

U.S. PATENT DOCUMENTS

| | | | |
|---|---|---|---|
| 4,754,255 | * | 6/1988 | Sanders et al. .................... 340/64 |
| 4,843,964 | * | 7/1989 | Bickes, Jr. et al. ............... 102/202.5 |
| 5,090,321 | * | 2/1992 | Abouav ................................ 102/200 |
| 5,719,551 | | 2/1998 | Flick . |
| 5,721,527 | | 2/1998 | Simmons et al. . |
| 5,796,329 | | 8/1998 | Bachhuber . |
| 5,992,794 | * | 11/1999 | Rotman et al. .................... 244/17.17 |
| 6,106,038 | * | 8/2000 | Dreher ................................. 293/118 |

FOREIGN PATENT DOCUMENTS

| | | |
|---|---|---|
| 196 34 187 | 2/1997 | (DE) . |
| 195 38 337 | 4/1997 | (DE) . |
| 19637677 * | 3/1998 | (DE) .............................. B03B/9/06 |
| WO 98/37488 | 8/1998 | (WO) . |

* cited by examiner

*Primary Examiner*—Fritz Fleming
(74) *Attorney, Agent, or Firm*—Evenson, McKeown, Edwards & Lenahan, P.L.L.C.

(57) ABSTRACT

In the case of a process for deactivating pyrotechnic actuators in vehicles, the actuators are triggered jointly if a code signal provided for this purpose and stored in the vehicle is fed from the outside. The two code signals are checked with respect to their conformity.

17 Claims, 1 Drawing Sheet

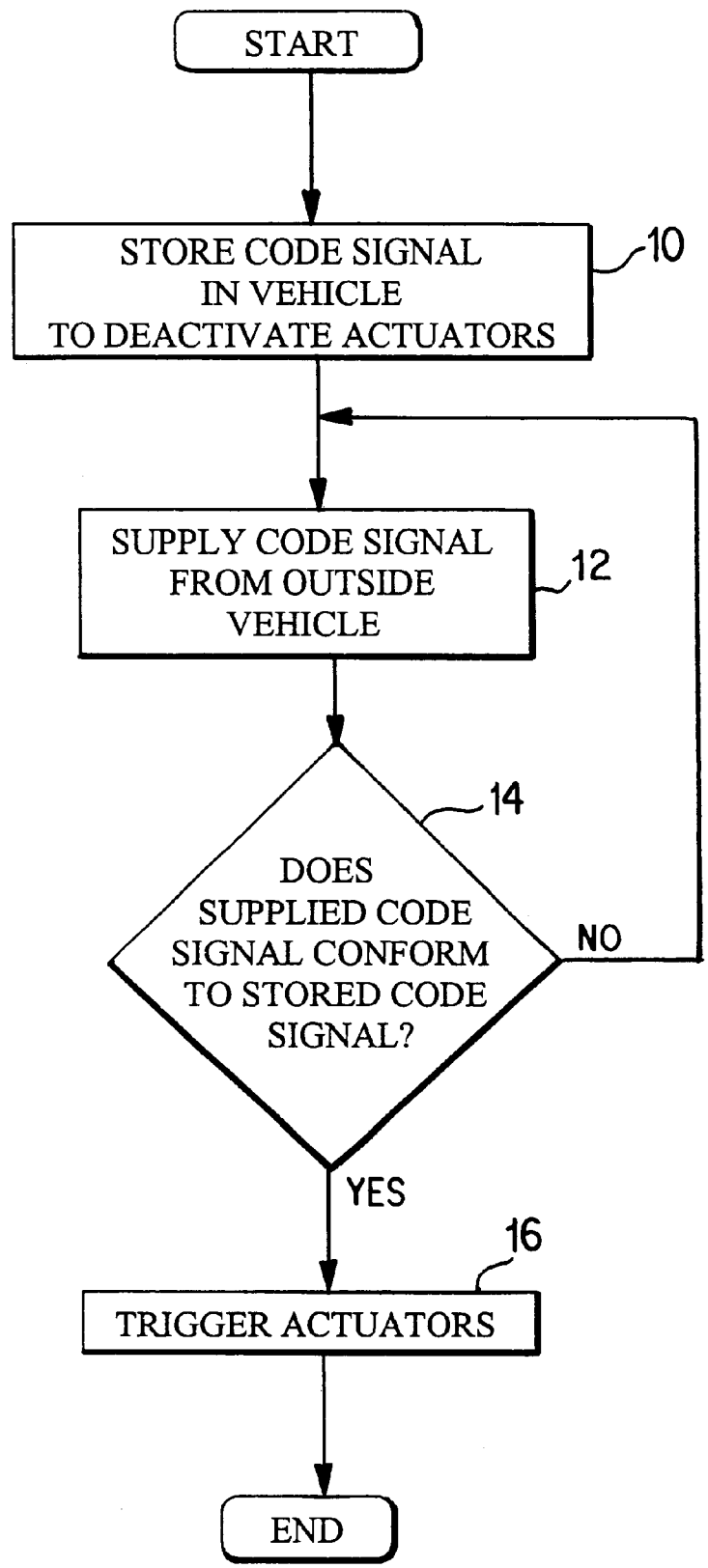

PROCESS FOR DEACTIVATING PYROTECHNIC ACTUATORS IN A VEHICLE

BACKGROUND AND SUMMARY OF THE INVENTION

This application claims the priority of German Application No. 198 49 079.8, filed Oct. 24, 1998, the disclosure of which is expressly incorporated by reference herein.

The invention relates to a process for deactivating pyrotechnic actuators in a vehicle.

It is a legal requirement for the recycling of used vehicles that all pyrotechnic actuators, which are preferably used in the case of safety systems, such as air bags, belt tightening devices, and the like, must either be triggered or removed from the vehicle before the vehicle is processed in the shredder. In addition, vehicle manufacturers will, in the future, take back and recycle old vehicles free of charge. It therefore becomes necessary to make the recycling of all components as reasonably cost effective as possible. For deactivating pyrotechnic components, after the removal of the covering parts, the connection wires of the priming caps are made accessible and the actuators are then triggered by applying a voltage thereto. Particularly, in view of the increasing number of pyrotechnic actuators used in the vehicle, this approach is time-consuming and therefore cost-intensive. The removal of pyrotechnic actuators is also not feasible because of time and cost expenditures.

It is an object of the invention to provide a process of the above-mentioned type by which several pyrotechnic actuators can be deactivated at reasonable cost and in an environmentally acceptable manner.

The present invention achieves this object by a process for deactivating pyrotechnic actuators in a vehicle, characterized in that the actuators are triggered jointly if a code signal provided for this purpose and stored in the vehicle is fed from the outside and a checking of the two code signals is carried out with respect to their conformity.

Other objects, advantages and novel features of the present invention will become apparent from the following detailed description of the invention when considered in conjunction with the accompanying drawings.

BRIEF DESCRIPTION OF THE DRAWING

The FIGURE is a flow chart illustrating the process according to the invention.

DETAILED DESCRIPTION OF THE DRAWING

The figure illustrates the process according to the invention. Initially, a code signal, which is used to trigger the pyrotechnic actuators, is stored in the vehicle (step 10). When it is desired to deactivate the actuators by triggering them, the code signal is fed to the vehicle from outside the vehicle (step 12). It is then checked whether the supplied code signal conforms to the stored code signal (step 14). If yes, then the actuators are jointly triggered (step 16), otherwise the system awaits the correct code signal.

As the result of (or following the one-time input of) "the" code signal, the actuators are deactivated simultaneously or successively at a defined time interval. The diagnostic or bus interface can preferably be provided for the input. It is therefore achieved by means of the invention that this triggering is absolutely safe with respect to any faulty triggering and misuse. Electro-mechanical manipulation of an on-board power supply can be used to prepare for the triggering operation;

In order to increase the above-mentioned safety aspect against misuse, the triggering of the pyrotechnic actuators is protected by way of a vehicle-individual code signal (in the form of a code number). During manufacture of the vehicle, this code number is entered, for example, in the air bag control unit in a nonvolatile, nonreadable and nonoverwritable manner and is filed in parallel thereto in a central external memory databank.

When the vehicle is scrapped, this number is retrieved by an authorized person whose identity is stored along with the code number. This access to the databank is documented so that the operation can be reconstructed. Thus, it is also filed in the databank that the concerned vehicle was scrapped.

The process according to the invention ensures that, also in the event the process and the pertaining messages on the interface to the control unit become known, an unauthorized triggering of the pyrotechnic actuators is prevented.

In order to increase the protection against faulty triggering, it is also suggested that, in addition to the described messages, a hardware signal must be applied for triggering the actuators. For this purpose, it may be useful, for example, to detach an external, relatively easily accessible sensor and to attach a "recycling control unit", which emits a signal that does not occur in normal operation. As a result, in the event of a disturbance of the communication via the abovedescribed interface, faulty triggering is prevented from taking place.

This results in a process for the one-time triggering of the pyrotechnic actuators which is easy to handle and is safe with respect to an unauthorized use.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for deactivating pyrotechnic actuators in a vehicle, the process comprising the acts of:

storing a code signal in the vehicle for triggering the actuators; and jointly triggering the actuators if an exteriorly fed code signal conforms to the code signal stored in the vehicle.

2. Process according to claim 1, wherein the act of jointly triggering the actuators triggers the actuators simultaneously.

3. Process according to claim 1, wherein the act of jointly triggering the actuators triggers the actuators successively at a defined time interval.

4. Process according to claim 1, further comprising the act of, for preparing a triggering operation, electromechanically manipulating an on-board power supply.

5. Process according to claim 2, further comprising the act of, for preparing a triggering operation, electromechanically manipulating an on-board power supply.

6. Process according to claim 3, further comprising the act of, for preparing a triggering operation, electromechanically manipulating an on-board power supply.

7. Process according to claim 1, wherein the code signal stored in the vehicle.

8. Process according to claim 2, wherein the code signal stored in the vehicle is stored as a non-readable, non-overwritable code.

9. Process according to claim 3, wherein the code signal stored in the vehicle is stored as a non-readable, non-overwritable code.

10. Process according to claim 4, wherein the code signal stored in the vehicle is stored as a non-readable, non-overwritable code.

11. Process according to claim 1, wherein the code signal stored in the vehicle is stored as a non-readable, non-overwritable code vehicle-individual signal and is centrally stored.

12. Process according to claim 2, wherein the code signal stored in the vehicle is stored as a non-readable, non-overwritable code vehicle-individual signal and is centrally stored.

13. Process according to claim 3, wherein the code signal stored in the vehicle is stored as a non-readable, non-overwritable code vehicle-individual signal and is centrally stored in an external memory.

14. Process according to claim 4, wherein the code signal stored in the vehicle is stored as a non-readable, non-overwritable code vehicle-individual signal and is centrally stored in an external memory.

15. Process according to claim 7, wherein the code signal stored in the vehicle is stored as a non-readable, non-overwritable code vehicle-individual signal and is centrally stored in an external memory.

16. Process according to claim 11, wherein the code signal stored in the external memory is stored as a signed accessible only to authorized persons.

17. Process according to claim 16, wherein identities of said authorized persons are stored when the stored code signal is supplied.

* * * * *